United States Patent Office 3,349,498
Patented Oct. 31, 1967

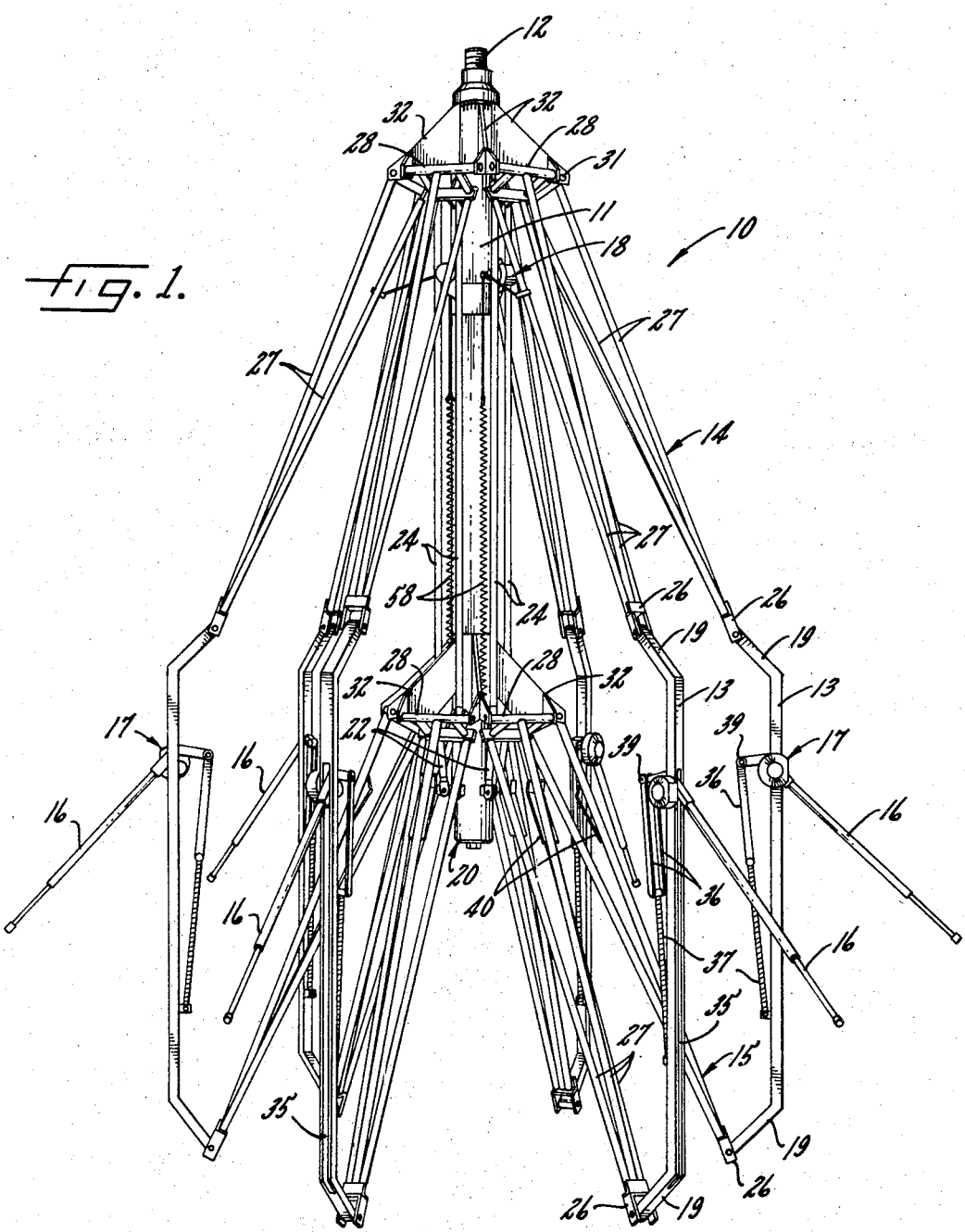

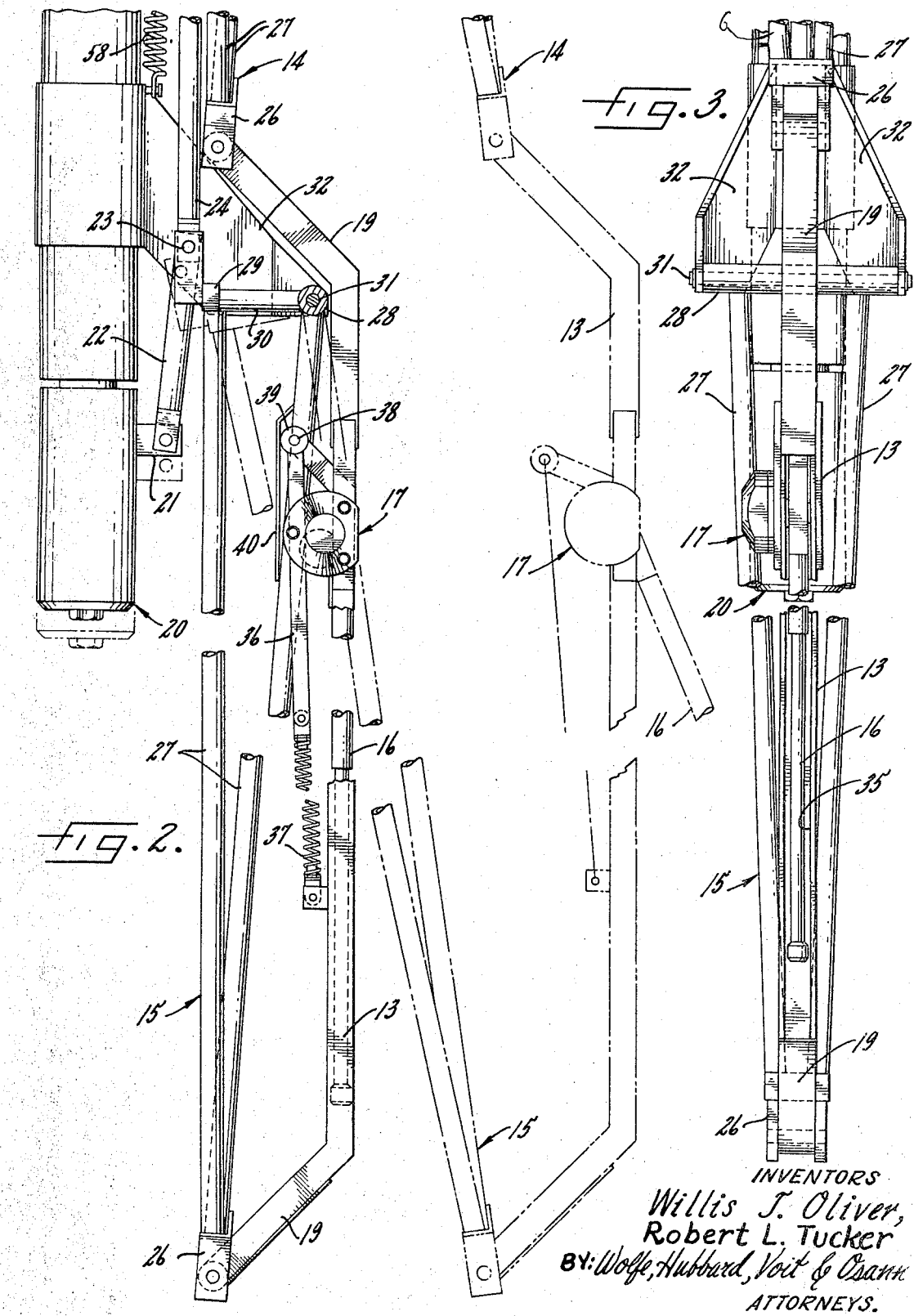

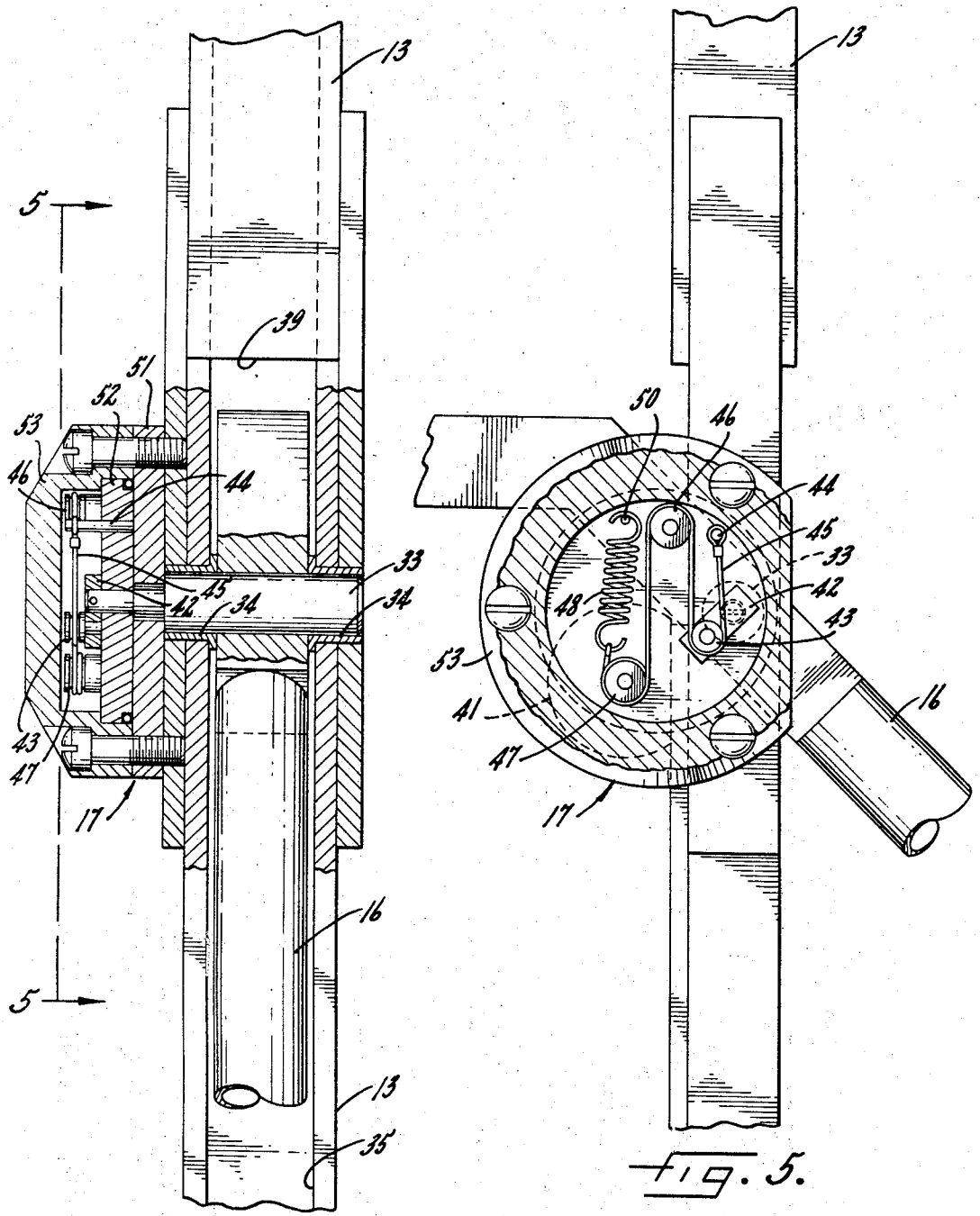

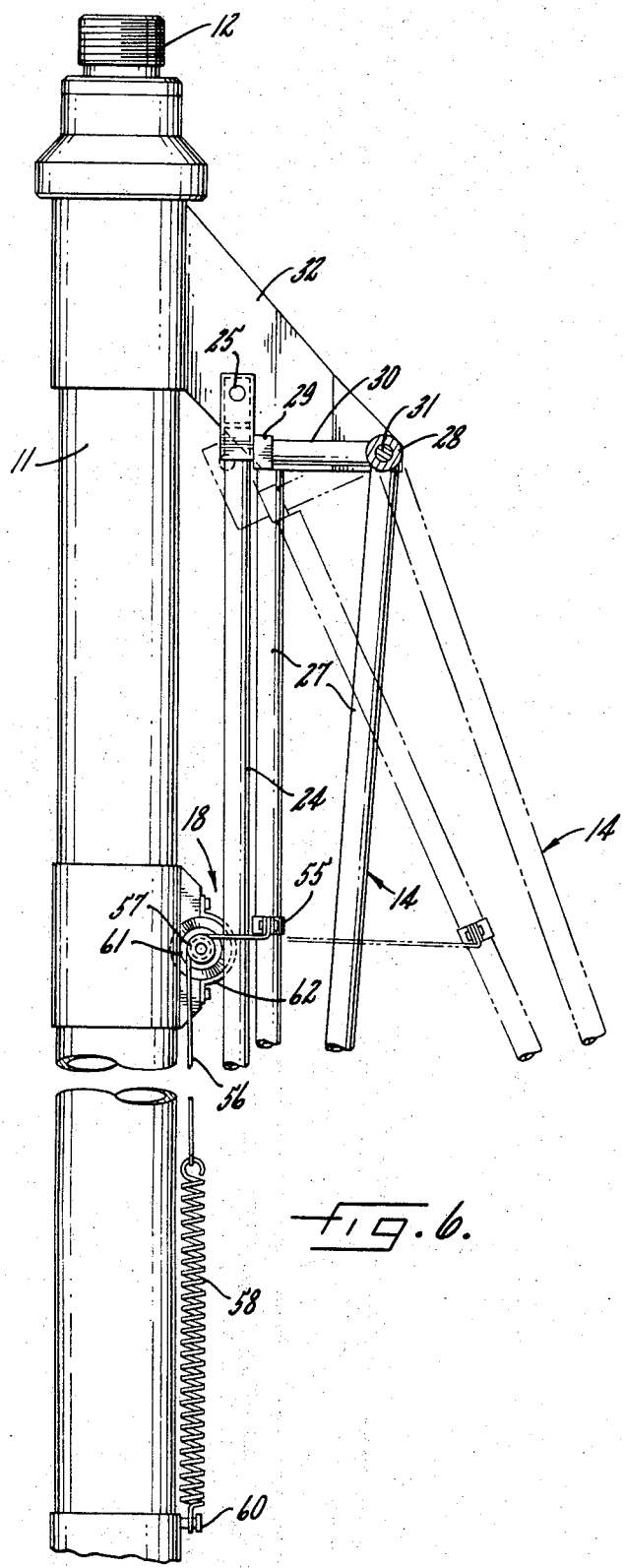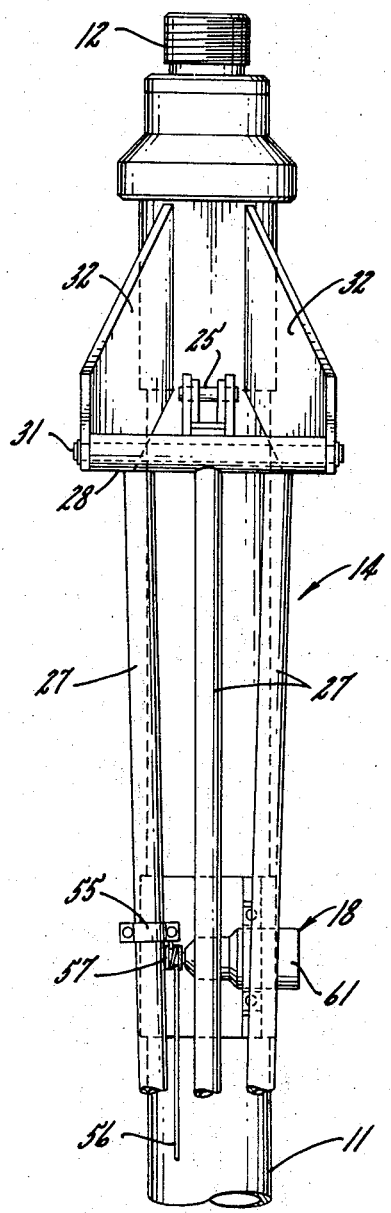

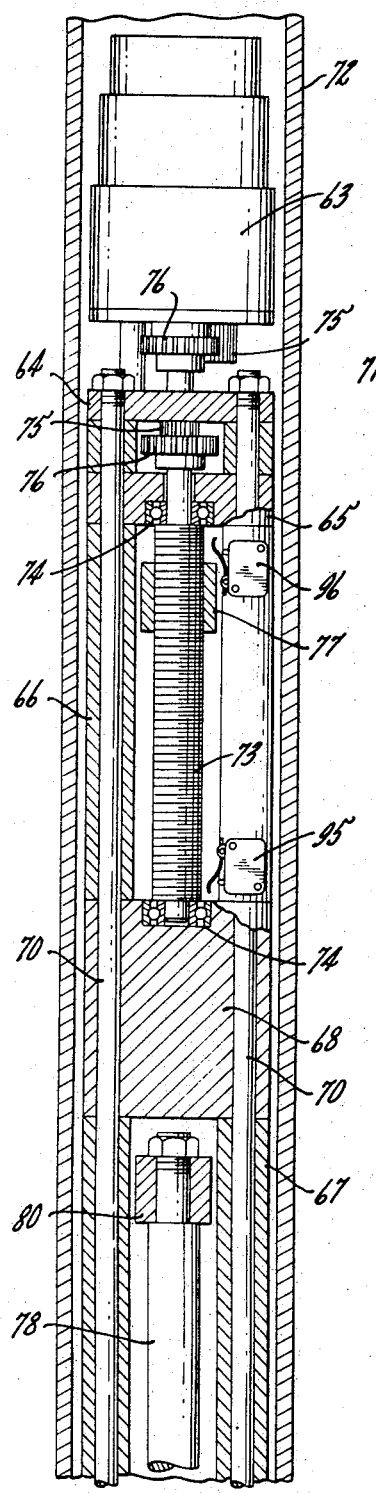

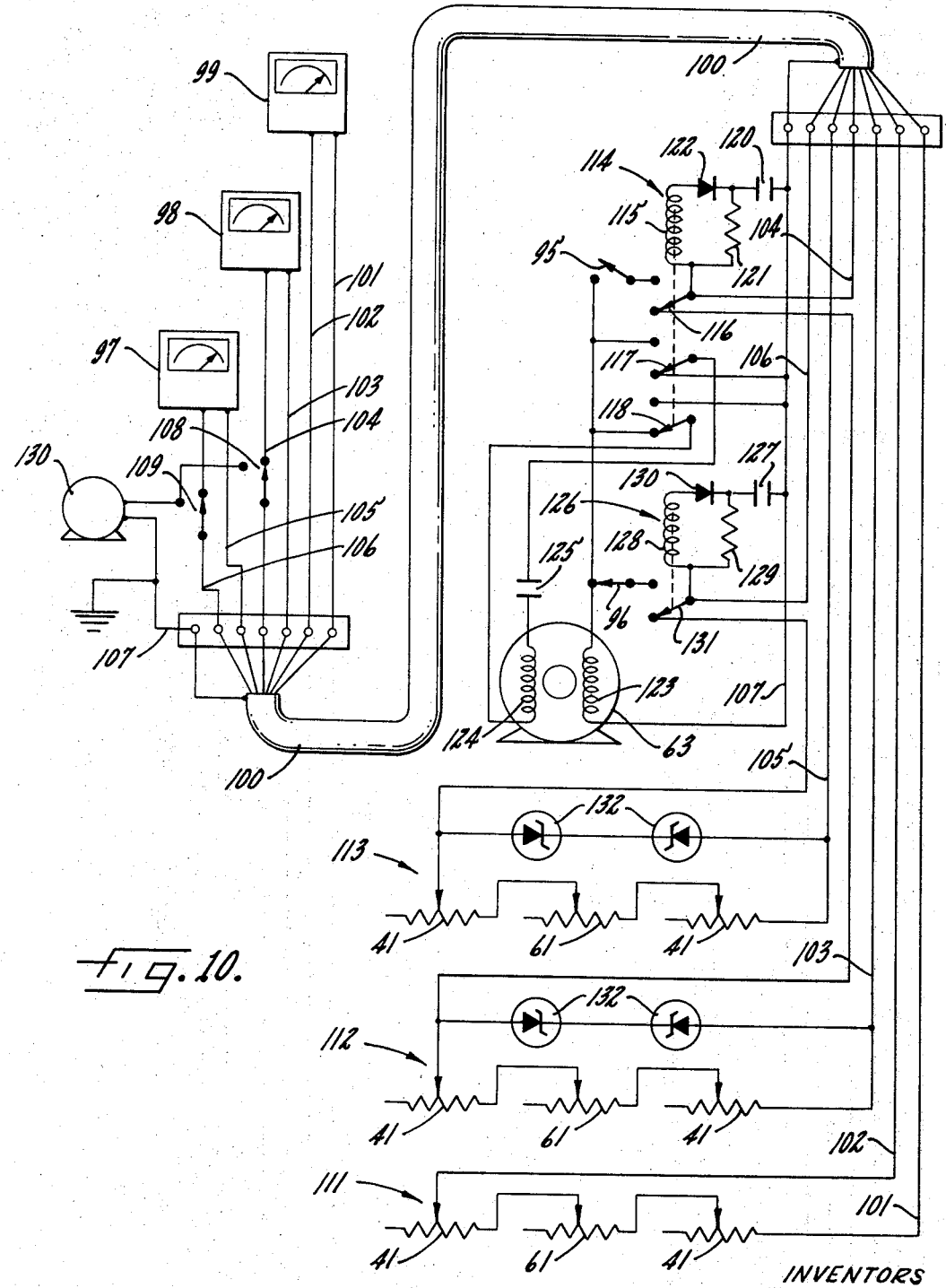

3,349,498
LARGE HOLE CALIPER
Willis J. Oliver, Derrick City, Pa., and Robert L. Tucker, Tulsa, Okla., assignors to Seismograph Service Corporation, Tulsa, Okla.
Filed Sept. 7, 1965, Ser. No. 485,227
11 Claims. (Cl. 33—178)

ABSTRACT OF THE DISCLOSURE

A logging tool adapted to measure the dimension of large boreholes is described in which a plurality of extendable feeler arms are carried on an expandable framework of rails with the relative positions of arms and rails being electrically sensed to indicate the diameter of the borehole.

---

This invention relates generally to well logging tools and more particularly to tools for the measurement of the transverse dimensions of large diameter bore-holes.

In the drilling of bore-holes into the earth for wells and for other purposes, it is often desirable to accurately measure the diameter of the bore-hole at its various depths. This is usually done by lowering a logging tool to the bottom of the bore-hole and continuously recording the output signal corresponding to bore-hole diameter as the tool is drawn back to the surface.

Certain specialized applications require the drilling of bore-holes having considerably larger diameters than have heretofore been common. In some instances they range as wide as 85 inches. When these bore-holes must meet rigid requirements of straightness and uniformity of diameter, highly accurate logging tools must be used to measure their diameters at every depth, from the base of the bore-hole up to the surface. Logging tools as have heretofore been used for the measurement of small-diameter bore-holes have an insufficient range of measurement to meet such requirements. When the smaller tools are scaled up in size to meet the requirements of large bore-holes, the results are unsatisfactory. These designs generally employ sensing arms which swing from a fixed central pivot, and when the arm is merely increased in length to accommodate a greater range of measurement, inaccuracy and poor resolution of detail result. Also, the elongated sensing arms are unable to fully enter some crevices which are small relative to the size of the arm due to interferences with the edge of the crevice.

In view of these requirements, the primary object of this invention is to provide an improved tool for the accurate measurement of very large diameter bore-holes.

Another object is to provide a tool capable of accurately measuring bore-holes over a relatively wide range of different diameters. A related object is to provide a tool having sensing arms which are short relative to hole diameter for providing greater accuracy of measurement, resolution of small details, and ability to extend fully into small hole irregularities.

Another object is to provide a tool of the above description capable of simultaneously measuring more than one diameter at a given bore-hole depth so as to indicate the "roundness" of the hole. A related object is to provide a tool of the above description in which each diameter measured is represented by a single continuous output signal which varies in linear relationship with hole diameter as the logging tool is withdrawn from the bore-hole.

A further object is to provide a tool of the above description capable of being collapsed into a narrow package for easily positioning and use, as well as ease of handling while being transported to and from the work site. A related object is to provide a tool of the above description which is rugged and able to withstand the rigors of hard use in the field. A still further object is to provide a tool of the above description which is capable of quick and easy insertion into a bore-hole and which may then be easily withdrawn without danger of jamming in the bore-hole while measurements are being made.

Other objects and advantages of the invention will become apparent upon reading the following detailed description and upon reference to the drawings, in which:

FIGURE 1 is a perspective of a tool embodying the invention;

FIG. 2 is a fragmentary elevation of a portion of the structure shown in FIG. 1 in which alternate operating positions are illustrated in phantom;

FIG. 3 is a fragmentary side elevation of the structure illustrated in FIG. 2;

FIG. 4 is an enlarged section of one of the potentiometer assemblies appearing in FIG. 1;

FIG. 5 is a section taken approximately along the line 5—5 in FIG. 4;

FIG. 6 is a fragmentary elevation of the upper portion of the tool appearing in FIG. 1;

FIG. 7 is a fragmentary elevation, rotated 90°, of the structure of FIG. 6;

FIGS. 8a and b are upper and lower fragmentary sections taken longitudinally through the central portion of the tool illustrated in FIG. 1;

FIG. 9 is a fragmentary section of the central portion of the tool illustrated in FIG. 1 and taken through a plane rotated 90° from that of FIGS. 8a and b; and FIG. 10 is a schematic diagram of the electrical circuitry associated with the tool appearing in FIG. 1.

While the invention will be described in connection with a preferred embodiment, it will be understood that we do not intend to limit the invention to that embodiment. On the contrary, we intend to cover all constructions as may be included within the spirit and scope of the invention as defined by the appended claims.

Turning now to the drawings, FIG. 1 shows a bore-hole tool 10 constructed in accordance with the invention and disposed in an expanded configuration such as it would have in actual use during the measurement of a bore-hole. The tool is constructed about a central body 11 having a threaded fitting 12 at its upper end by which the tool may be attached to a logging cable for insertion into and withdrawal from the bore-hole. A plurality of arms 16 extend outwardly about the periphery of the tool to engage the wall of the bore-hole being measured by the tool 10.

In accordance with the invention, each of the arms 16 is pivoted on one of a plurality of rails 13, and the rails are pivotally supported on upper and lower links, in the form of truss assemblies 14 and 15, for spreading movement outwardly of the tool body 11. The angles of the arms 16 on the rails 13 are detected by position sensor assemblies 17, and the spread positions of the rails are detected by rail position sensor assemblies 18. The spreading of the rails enables wide holes to be calipered, and the combined information from the sensor assemblies 17, 18 provides the overall measurement data.

The rails 13 are preferably elongated rigid members having their upper and lower ends 19 bent sharply inwardly of the tool so that the pivot connections between the rails and the truss assemblies are not subject to damaging contact with the sides of a bore-hole. The construction and mounting of the upper and lower truss assemblies 14, 15 are substantially identical. In the illustrated form, each truss assembly includes a yoke 26 in which a rail end 19 is pivoted and which anchors the lower ends of three tubular rods 27 that diverge to form the truss configuration. At their upper ends, one of the rods 27 is fixed to a bushing 28 and the other rods are fixed to a short bar 29 that is rigidly spaced from the bushing 28 by a pair of spacers 30. The bushing 28 rotates on a shaft 31 supported between end flanges formed on support brackets 32 that are rigidly fixed to, and extend radially from, the tool body 11. The truss assemblies 14, 15 are thus lightweight and rigid, extending cantilever fashion from a solid pivotal mounting on the tool body so as to provide firm, positive support for the rails 13.

Preferably, the rails 13, the upper and lower truss assemblies 14, 15 and the tool body 11 define parallelogram linkages by which the rails can be positioned at various distances from the body 11 while remaining parallel to the body. In the illustrated arrangement, all of the rails are simultaneously positioned by an actuator head 20 which carries a number of actuator lugs 21 and which is moveable axially from the bottom of the body 11. Each lug 21 is attached by a link 22 to a pin 23 on a respective one of the power truss assemblies 15. Connecting links 24 share the pins 23 with the links 22 and serve to impart motion to upper truss arm assemblies 14 through attachment pins 25 (see FIG. 6).

In carrying out the invention, the arms 16 are biased outwardly of their respective rails 13 when in operating position and are swung inwardly to be completely recessed and protected when the rails are collapsed toward the tool body 11. One arm and rail assembly will be described in detail in connection with FIGS. 2 to 5; it being understood that the other assemblies are identical.

The arm 16 is mounted by a pin 33 fixed near its upper end and rotatably received in a pair of bushings 34 so that the arm is pivoted for movement in and out of an open channel 35 defined by the rail 13. The upper end of the arm projects through an opening 39 inwardly of the rail and is coupled by a pair of straps 36 to a tensioned helical biasing spring 37 which is anchored to the back of the rail 13. A pin 38 rotatably connects the straps 36 to the end of the arm 16, and a pair of rollers 39 are mounted on each end of the pin 38. Cam strips 40 are fixed to the outermost rod 27 of the adjacent lower truss assembly 15 so as to engage the rollers 39 when the rail 13 is swung in toward the body 11. The rollers 39 ride up along the strips 40, thus camming the arm 16 into the open channel 35 against the bias of the spring 37. When the tool is again opened up for use in measuring, very limited movement of the rail 13 in its outward direction from the central body 11 is enough to carry the rollers 39 from the cam strips 40 and the spring 37 swings the arm into extended sensing position.

In keeping with one aspect of the invention, the position sensor assemblies 17 translate swinging movement of the arms 16 to operation of electrical potentiometers in substantially linear relationship to the horizontal spacing of the arm tips from their mounting rails. Since the assemblies 17 are alike, a description of one, primarily in conjunction with FIGS. 4 and 5, will serve for all.

The assembly 17 includes a generally annular housing defined by a base plate 51 and a cover member 53 sandwiching between them a sealing plate 52. The assembly is screwed to the side of the rail 13 adjacent the pivoted end of the arm 16 and an O-ring seals the interior of the housing against the environment in which the tool 10 must operate. A potentiometer 41, preferably of the multiple turn type, is fixed on the plate 51 at the inside of the rail 13 and the potentiometer control shaft is extended into the housing of the assembly and provided with a pulley 47. The arm pivot pin 33 also extends into the housing and rigidly supports, at right angles to the arm 16, a crank arm 42 that journals a crank pulley 43.

A cord 45 transmits movement of the arm 16 to the potentiometer 41. From an anchor pin 44, the cord 45 is strung about the crank pulley 43, an idler pulley 46, and the potentiometer pulley 47. Tension is maintained in the cord 45 by means of a spring 48 attached to a second anchor pin 50. It will be observed that as the arm 16 is urged toward the walls of the bore-hole, the crank arm 42 tends to pull the crank pulley 43 in a direction away from the idler pulley 46 and from the cord anchor pin 44. The result of this movement is to draw the cord 45 over the potentiometer pulley 47, thus operating the potentiometer 41 while stretching the spring 48 as the cord 45 is pulled. The use of the crank pulley 43 and the anchor pin 44 allows the length of cord drawn past the potentiometer pulley 47 to be twice the length of the movement afforded by the crank arm 42. Movements of the arm 16 are thus magnified when transmitted to the potentiometer 41.

Furthermore, because the arm 16 and the crank arm 42 are disposed at right angles to one another, the angle made by the crank arm 42 to the horizontal will be identical to the angle made by the arm 16 to the vertical. The horizontal distance between the rail 13 and the tip of the arm 16 is a function of the sine of the angle made by the arm with respect to the vertical. Since the angles are the same, vertical movement of the crank pulley 43 on the arm 42 is also a function of this same variable. There is, therefore, a substantially linear relationship between the movement of the cord 45 past the potentiometer pulley 47 and the horizontal distance between the rail 13 and the tip of the arm 16. This relationship causes the rotation of the potentiometer 41 and its corresponding change in resistance to be a direct function of the horizontal distance between the rail 13 and the tip of the arm 16.

In carrying out the invention, the rail position sensor assemblies 18 are arranged to operate electrical potentiometers in substantially linear relationship to the horizontal spacing of the rails 13 from the tool body 11, and to give the same amount of potentiometer movement for an inch of rail movement as the sensor assemblies 17 give for an inch of arm 16 movement. For this purpose, the assembly 18 shown in FIGS. 6 and 7, the others being identical, includes a multiple turn potentiometer 61 secured to the body 11 by a clamp 62 that permits fine adjustment of the vertical position of the potentiometer. A pulley 57 is secured to the operating shaft of the potentiometer and a cord 56 is wrapped once about the pulley 57, secured by an adjustable clamp 55 to one of the upper truss assembly rods 27 and tensioned by a spring 58 anchored to the body 11 by a pin 60. In operation, as the rails 13 are moved outward, the upper truss assembly 14 swings upwardly as is shown in phantom in FIG 6. The cord 56 is thus drawn over the potentiometer pulley 57 against the force of the spring 58. The potentiometer 61 is thereby rotated, causing a change in its resistance which may be measured. The cord clamp 55 is positioned so that the cord 56 is pulled substantially horizontally as the truss assembly swings out spacing the rail 13 from the tool body. Rotation of the potentiometer 61 is thus directly proportioned to the horizontal spacing of the rail. It can also be seen that the vertical position of the potentiometer from the pivot point of the truss assembly determines the amount of rotation of the pulley 57 for each increment of horizontal rail movement caused by swinging the truss assembly. Therefore, the vertical position of the potentiometer clamp 62 is selected so that one inch of horizontal rail movement rotates the pulley 57 the same amount as one inch of horizontal movement of the tip of the arm 16 rotates the potentiometer 41 in the sensor 17. Stated another may, one unit of displacement of the arm 16 corresponds in total resistance change in its associated potentiometer 41 with an equal unit of displacement of the rail 13 as reflected in the resistance change of its associated potentiometer 61. This enables the sensor potentiometers to be electrically connected in series so that their output may be simply and directly summed to give a single direct reading of bore-hole diameter.

The actuator head 20 is operated by a synchronous motor 63 disposed in protected relation within the body 11 and operating through a pressure balanced arrangement that functions easily and reliably even when the tool is immersed in high fluid pressures. In the illustrated construction, the motor 63 is mounted on a frame plate 64, which is part of an internal frame made up of another plate 65, spacers 66 and 67, and a block 68, all secured together by long bolts 70 to a bulkhead 71 (see FIG. 8b), that closes the end of a tube 72 which forms the outer shell of the central body 11.

A drive screw 73 is axially fixed in thrust bearings 74 seated in the frame plate 65 and the block 68. Pinions 75 and gears 76 rotatably couple the motor 63 to the drive screw 73. A nut member 77 is threadably mounted on the drive screw.

The actuator head 20 is attached by a nut 79 to an actuator rod 78 that is sealed in sliding relation through the bulkhead 71. The inner end of the actuator rod 78 is secured to a flange member 80 which is in turn secured to a pair of rods 81 that slidably pass through the block 68 and engage the nut member 77. It can thus be seen that energization of the motor 63 rotates the screw 73 through the pinions 75 and gears 76 so that the nut member 77 is rotatably moved along the length of the screws 73. Movement of the nut member 77 is transmitted through the rods 81 to the flange member 80 so as to slide the actuator rod 78 and thus the actuator head 20. As has been heretofore described the actuator head is connected through linkages to the rails 13 and causes them to open or collapse, depending on the direction of rotation of the motor 63.

Preferably, the actuator rod 78 is formed with a central passage 82 that extends downward through the rod 78 and is open to the environment within the bore-hole. The passage 82 communicates with a pressure chamber 83 which lies above a shoulder 84 on the actuator rod 78. The shoulder 84 is slidably received within a cylindrical spacer 85 which is, in turn, received within the bulkhead 71. On the other side of the shoulder 84 is a chamber 86 which communicates by means of a slot 87 in the spacer 85 and a passage 88 in the end member bulkhead 71 with the environment within the tube 52. The bulkhead assembly is completed by a sealing block 90, that is held in place by an end plate 91 and a plurality of cap screws 92.

The actuator head 20 is formed as a closed-end cylinder and is telescoped over the end of the bulkhead 71. A vent passage 93 through the head 20 equalizes the fluid pressure within and without the head, except for the area represented by the cross section of the rod 78. As the actuator head 20 is advanced downward by the actuator rod 78, high pressure fluid within the bore-hole enters the head by means of the vent passage 93. The area of the shoulder 84 is substantially equal to the cross sectional area of the rod 78 so that the bore-hole pressure exerted through the central passage 82 to the pressure chamber 83 exerts a counter force equal to that tending to force the actuator rod 78 upwardly into the body of the tool. The slot 87 and the passage 88 prevent a pressure build-up on the underside of the shoulder 84.

In the illustrated construction, there are six arms 16 with supporting rails 13 arranged in three sets of pairs, the arms 16 of each pair being diametrically opposed to measure the hole diameter. The three sets thus measure three diameters which divide the bore hole into sixths. Each set of arms and rails include one of the sensor assemblies 18 so that there are two potentiometers 41 and one potentiometer 61 defining assemblies 111, 112 and 113 for measuring the diameters.

The potentiometers 41, 61 in each assembly 111, 112, 113 are connected in series and are coupled by a cable 100 to a respective one of three recorders 97, 98 and 99 located at the surface of the hole into which the tool 10 is lowered (see FIG. 10). Preferably, the series connected potentiometers in each set electrically form an arm of a D-C bridge in the recorders, and recorder action drives an internal slidewire resistance to produce zero output from the bridge in response to unbalances generated by the changes in potentiometer resistance within the tool 10. As mentioned previously, the values of the rail potentiometers 61 and the arm potentiometers 41 are such that the incremental resistance change from a given increment of movement of any rail 13 is the same as for that of the same movement of an arm 16. Thus, the combined electrical outputs of the potentiometers in a set of the rails 13 will be the same for varying relative positions of the rails 13 and the arms 16 within a given bore-hole, provided the tips of the arms 16 remain in contact with the bore-hole walls.

As a feature of the invention, the motor 63 is powered in both forward and reverse directions, and the assemblies 111, 112, 113 are connected to the recorders by only six conductors 101–106 and a ground lead 107 making up the cable 100. Conductors 101 and 102 serve to carry the signal produced by assembly 111. Similarly, conductors 103 and 104 carry the signal from assembly 112, and conductors 105 and 106 carry the signal from assembly 113. Conductor 107, the ground lead, serves as a common line for operation of the motor 63. Conductors 104 and 106 are also used to apply A-C power to the motor 63 in a way that isolates the potentially damaging A-C voltages and currents from the potentiometer assemblies 111, 112, 113. The synchronous motor 63 is driven by a power source 130 remote from the tool 10 which supplies A-C voltage at a constant frequency. This allows accurate control of the positioning of rails 13 by simply controlling the time that the motor 63 is allowed to run.

To extend the rails 13 from the tool body, a switch 108 in the connector 104 on the surface is actuated to remove potentiometric recorder 98 from its measuring circuit and to connect conductor 104 to the source of A-C power 130. Operating through the circuit formed by the conductor 104 and the ground lead 107, A-C voltage is applied across a rectifying network 114 located within the tool 10. This network includes a blocking capacitor 120 to block D-C currents when its associated potentiometer assembly 112 is being utilized for measurement, while application of an A-C voltage causes current to pass the network 114 and energize a relay 115. Under an A-C voltage, the capacitor 120 is alternately charged and discharged. During the charging portion of the cycle, current is drawn from the conductor 104 through a resistor 121, and also through the coil of the relay 115 by way of a diode 122. During discharge of the capacitor, the diode 122 blocks the flow of current through the core of the relay 115 and the return current is all carried by the resistor 121. In this way, a net flow of D-C current is caused to pass through the coil of the relay 115. Because the net flow through the relay coil is D-C, advantage may be taken of the high levels of sensitivity which may only be obtained in D-C type relays.

Energization of the relay 115 actuates three motor switches 116, 117 and 118. Actuation of the switch 116 directs A-C power through a normally closed limit switch 95 (see also FIG. 8a) to a primary winding 123 of the motor 63, which is connected at its other end to the ground lead 107. Actuation of the switch 117 carries current from the switch 116 to a secondary winding 124 which is also connected to ground through the switch 118. A capacitor 125 in the circuit with the secondary winding 112 serves to supply a phase shift for the purpose of starting the motor 63 in the proper direction for opening the tool 10. The motor 63 continues to open the tool until the switch 108 is opened, or the nut member 77 trips the switch 95. Restoring the switch 108 returns the recorder 98 into a measuring circuit with the assembly 112.

To close the tool 10, a switch 109 in the conductor 106 is actuated to remove the potentiometric recorder 97 from its measuring circuit and to connect conductor 106 to the power source 130. Thus, the A-C voltage is applied across a rectifying network 126, which functions in a manner identical to the network 115. A blocking capacitor 127 prevents the flow of D-C current through the coil of a relay 128, while A-C voltage causes current flow through the coil of the relay 128 and the resistor 129 with a diode 130 serving to rectify the current and provide D-C for operation of the relay 128. The relay 128 actuates a switch 131, causing current flow through a limit switch 96 (see also FIG. 8a), and energizing the primary winding 123 of the motor 63 just as during opening of the tool 10. Switches 117 and 118 remain in their non-operated positions during closing of the tool because the relay 115 remains de-energized. The path of current flow through the secondary winding 124 is now the reverse of that during opening, and the motor is thereby caused to rotate in the opposite direction, serving to close the tool 10. The limit switch 96, normally closed, trips when the tool reaches its fully closed position, thereby preventing damage from overrun. The switch 109 is then returned to its normal position to remove the A-C power source 98 from the tool circuit.

A pair of back-to-back Zener diodes 132 is also provided in the measuring circuits associated with the conductors 104 and 106 used to open and close the tool 10 so that, in the event that conductors 104 or 106 should be leaking or shorted, or in the event of a failure or delay in operation of relays 115 and 128, the peak-to-peak A-C voltage that might otherwise occur across the potentiometer assemblies 112 and 113 is reduced to a safe value. Maximum voltages are thus limited so that destructive power levels cannot reach the associated potentiometers 41 and 61.

In summary, it may be seen that the bore-hole logging tool of the present invention allows the logging of very large bore-holes with a degree of accuracy heretofore unattainable with tools of this kind. By employing several relatively short sensing arms disposed about the tool axis and swinging from pivots which are themselves radially moveable to accommodate holes of varying diameter, a high degree of flexibility has been obtained in a large instrument without loss of the accuracy or ability to resolve small details which are inherent in smaller instruments. The shorter arms produce signals of greater accuracy than would long sensing arms extending from a central body since small wall anomalies cause greater angular changes of a short sensing arm. The shorter arms can also readily swing in and trace small cavities or crevices in bore hole walls.

It will also be noted that the rails 13 on which the sensing arms 16 are pivoted define a generally cylindrical pattern which can be fitted within a bore hole rather closely by translating the rails radially from the central body 11. This tends to keep the tool 10 centered in the hole being calipered and, as a result, the sensing arms measure true diameters rather than chords.

The use of matched position sensors and series circuitry for each of several diameters allows direct readout of diameter information as well as the continuous logging and recording of several channels of data as the tool is withdrawn from the hole. Additionally, the electrical circuitry provided for sensing the several diameters is utilized for the additional purpose of energizing the motor which expands the tool into its operating position, this operation being safeguarded by limit switches and voltage regulating devices to provide against accidental damage from short circuits or other malfunctions.

We claim as our invention:

1. A hole caliper comprising, in combination, an elongated central body adapted to be secured to a logging cable, a pair of rails positioned one on either side of said body, a pair of sensing arms one pivoted on one of said rails and the other pivoted on the other of said rails, means for urging said arms outwardly of said body, links interconnecting each of said rails and said body, means including a motor in said body for swinging said links to selectively space said rails from said body, and means for sensing the angle of said arms with respect to said rails.

2. The combination of claim 1 in which said pair of rails is one of a plurality of similar pairs spaced peripherally about said central body.

3. The hole caliper of claim 1 in which said means including a motor in said body for swinging said links comprises, in combination, an electric motor mounted in said central body, a screw rotatably coupled to said motor and being axially fixed within said central body, a bulkhead forming a sealed end of said central body, an actuator rod sealed in said bulkhead for axially slidable movement, means for imparting swinging movement to said links from the axial movement of said rod, a nut on said screw, means interconnecting said nut and said actuator rod, and means including a piston connected to said actuator rod and operating within a chamber communicating with the environment surrounding the hole caliper for balancing the forces on the actuator rod due to pressure in the borehole.

4. The combination of claim 1 in which said links include a pair of elongated truss members for each said rail and defining, with said body and said rail, parallelogram linkages capable of extending said rails laterally of and parallel to said body from a collapsed position against said body.

5. The combination of claim 4 including a cam and follower for each of said arms to cam the arms into substantially parallel relation to said rails when the rails are collapsed against said body.

6. A hole caliper comprising, in combination, an elongated central body adapted to be secured to a logging cable, a plurality of brackets at each end of said central body extending outward to define yokes, a plurality of rails positioned about said central body, said rails having at each end an inward-directed portion such that the ends of said rails may rest alongside said central body without interfering with said yokes, links interconnecting the ends of each rail with a corresponding yoke at each end of said central body, said links consisting of truss members pivoted about said yokes, a sensing arm pivoting on each of said rails, means for urging said arms outwardly from said body, means for sensing the angle of said arms with respect to said rails, and means including a motor in said body for swinging said links to selectively space said rails from said body.

7. A hole caliper comprising, in combination, an elongated central body adapted to be secured to a logging cable, a pair of rails positioned one on either side of said body, a pair of sensing arms one pivoted on one of said rails and the other pivoted on the other of said rails, means for urging said arms outwardly of said body, links interconnecting each of said rails and said body, means including a motor in said body for swinging said links to selectively space said rails from said body, means including a first variable electrical resistance for sensing the angle of said links with respect to said body, and means including a second variable electrical resistance means for sensing the angle of said arms with respect to said rails, said first and second variable electrical resistances being electrically connected in series.

8. A hole caliper comprising, in combination, an elongated central body adapted to be secured to a logging cable, a pair of rails positioned one on either side of said body, a pair of sensing arms one pivoted on one of said rails and the other pivoted on the other of said rails, means for urging said arms outwardly of said body, links interconnecting each of said rails and said body, means including a motor in said body for swinging said links to selectively space said rails from said body, first sensing means including a first variable resistance having a resistance value which varies in proportion to the distance between the outer end of each arm and its associated rail, and second sensing means associated with each arm including a second variable resistance which varies in proportion to the distance between said rails, said first sensing means having a ratio of incremental change in resistance to incremental change in distance between each arm and its associated rail which is substantially equal to the ratio of incremental change in resistance to incremental change in distance between said rails in said second sensing means, said first and second variable electrical resistances being electrically connected in series.

9. For use in a hole caliper for measuring dimensions perpendicular to a central axis with a sensing arm pivotally connected to said caliper and means for urging said sensing arm outwardly of said caliper, a sensing arm position sensor comprising, in combination, a crank arm affixed to said arm at said sensing arm pivot, a avriable electrical resistance having a shaft in which resistance change is substantially proportional to shaft rotation, a flexible cord strung about said shaft, said cord being in translatable engagement with said crank arm, resilient tensioning means for maintaining said cord in taut non-slipping engagement with said shaft, and pulley means for transmitting movement of said cord from said crank arm to said shaft, said pulley means in addition maintaining the relative position of said cord to said crank arm so that the angle therebetween is substantially equal to 90° less the angle between said sensing arm and said central axis.

10. In a hole caliper having a central body, a plurality of links pivotally attached to said body for movement between open and closed positions, said body incorporating means including a reversible electric motor having terminals for connection to a source of current for operation in a normal and a reverse direction for respectively opening and closing said links, said links each having means including a variable electrical resistance for measuring the angle of said links relative to said central body, said resistances being electrically connected to resistance measuring equipment at a location remote from the caliper by means including a multiple-conductor cable having a ground wire, and each resistance being connected to at least one conductor, the improvement comprising: a first and a second electrically operated relay, said relays being unresponsive to the application of D.-C. voltage, said first relay being actuated by the application of an A.-C. voltage between a first conductor and said ground wire, said first relay in the normal position connecting said first conductor to its associated resistance and when actuated serving to disconnect said first conductor and to connect it to said motor in a manner causing motor rotation in the normal direction, and said second relay in the normal position connecting said second coductor to its associated resistance and when actuated serving to disconnect said second conductor and to connect it to said motor in a manner causing rotation in the reverse direction, thereby opening and closing said links without the passage of motor current through the said resistances.

11. In a large borehole caliper, the combination comprising, a body, a plurality of generally parallel movable rails disposed in a cylinder defining pattern about said body, connecting means for articulating said rails to said body for movable translation radially thereof, power means for selectively expanding and contracting said rails relative to said body, a sensing arm pivoted to each of said rails for swinging movement outwardly from said pattern, means for urging said arms outwardly to contact the walls of the hole to be measured, and means for sensing the pivoted angle of said arms relative to said rails.

References Cited

UNITED STATES PATENTS

| 2,398,562 | 4/1946 | Russell | 33—178 X |
| 2,622,334 | 12/1952 | Wiley | 33—178 |
| 2,771,686 | 11/1956 | Hamontre et al. | 33—178 |
| 2,855,685 | 10/1958 | Barreteau | 33—178 X |

FOREIGN PATENTS 230,860  2/1911  Germany.

SAMUEL S. MATTHEWS, *Primary Examiner.*